Ferril A. Losee,
Arthur J. Hannum,
INVENTORS.
BY
R. A. Bogucki
ATTORNEY.

Ferril A. Losee,
Arthur J. Hannum,
*INVENTORS.*
*BY.*

R. A. Boguchi

*ATTORNEY.*

United States Patent Office 3,027,543
Patented Mar. 27, 1962

3,027,543

PULSE DECODING CIRCUIT

Ferril A. Losee, Los Angeles, and Arthur J. Hannum, Lawndale, Calif., assignors to Hughes Aircraft Company, Culver City, Calif., a corporation of Delaware Filed Feb. 26, 1958, Ser. No. 717,786
10 Claims. (Cl. 340—167)

This invention relates to circuits for integrating and decoding pulse signals, and particularly to circuits for providing pulses of either polarity in response to pluralities of pulses arranged in groups.

Many communication systems are employed today which utilize the transmission of signals in a number of channels which vary in frequency. These systems, which are usually pulse systems, minimize deleterious effects due to multipath propagation and noise in the propagation medium. In addition to the extremely high reliability which can be obtained with these systems, it is also possible to code the information involved for various purposes, because of the various combinations which are possible with the different frequencies and pulse positions which may be selected.

An example of these multichannel pulse systems which is particularly suited for high reliability operation is a pulse code communication system in which individual characters (letters and numerals) are represented by combinations of symbols (marks and spaces) each consisting of a given pulse arrangement. One particularly advantageous scheme in this system utilizes mark and space pulses of opposite polarity, and transmits these pulses in a predetermined number of groups of serially spaced pulses. This system may therefore be termed a quantized frequency modulated code system, the quantized pulse being the mark or space symbol which is represented by an integral number of individual pulses. The quantized pulse may be seen to be frequency modulated because of the groups of individual pulses transmitted according to a selected pattern in different frequency channels.

In quantized frequency modulated systems the information may be coded by sending like pulse groupings in the different channels, but varying the pulse groupings incrementally in time. While such an arrangement makes possible very effective discrimination against noise and multipath effects, the problem of recombining or decoding the number of groups of pulses is considerably increased. In particular, the problem of adding together the individual pulses from the different frequency channels and separating out these pulses to provide mark or space pulses of either polarity, to which each of the individual pulses contributes its full amplitude, is particularly difficult and sensitive. These problems are complicated both by the requirement for using pulses of opposite polarity, which may be termed dual symbol operation, and by other system requirements for different spacings between symbols. A form of pulse position modulation may be used, for example, for synchronization purposes, and such an added modulation greatly increases the problems of decoding the groups of pulses in different frequencies which represent an individual symbol.

Circuits of the prior art for recombining groups of pulses have not been confronted with problems as complex as those outlined above. The circuits of the prior art have usually been limited to single symbol operation, in that the pulse outputs provided have only been required to be of the same polarity. The circuits have additionally not been required to combine a plurality of groups of individual pulses in such a manner as to derive full contribution from each of the individual pulses. Numerous other operative requirements which are also desirable for a quantized frequency modulated system have likewise not heretofore been available from the prior art.

In addition to a decoding circuit which gives dual symbol operation with position modulated pulses, it is desirable that there be maximum rejection of long term interference, or fading, effects, and that the signal which is provided be suitable for signal regeneration and provide a usable amplified output without introducing undesirable operative factors into the remainder of the system. It is desirable, in other words, to provide a high-power output signal which has a high ratio to any stray signals which may be present, either in the form of intelligence pulses or of noise, and which is without further extensive modification suitable for driving other circuitry in the system.

It is therefore an object of this invention to provide an improved circuit for integrating and decoding into symbol pulses signal combinations represented by a number of groups of individual pulses.

Another object of this invention is to provide an improved circuit for providing pulses of either polarity from information in a quantized frequency modulated code.

Yet another object of this invention is to provide an improved circuit for generating, from groups of individual pulses, symbol pulses of either polarity having a high ratio of symbol pulse to stray and noise signal.

Still another object of this invention is to provide an improved circuit for decoding quantized frequency modulated pulse groupings which may additionally be pulse position modulated.

In accordance with the invention a circut may be employed which time shifts the individual groups of pulses which represent a symbol in a quantized frequency modulated code, and which then combines the groups of pulses into a single group of pulses and derives pulse groupings which are used to provide an output of either polarity representative of mark or space symbols. According to one feature of the invention, individual groups of pulses from the different frequency channels may be used to drive separate cathode followers which in turn feed, through a signal weighting network, a group of serially connected delay lines which time shift the individual groups of pulses into time coincidence. The combined group of pulses may then be converted into a parallel form through a second group of serially connected delay lines from which energy is derived by a pair of summation networks coupled to the second delay line sections in a predetermined fashion dependent upon the coding employed for the symbols used. The individual summation networks may be used to control a signal difference circuit which, together with the previously mentioned circuitry, so operates to derive signals from the second delay line grouping as to provide appreciable output pulses only when an intelligence symbol of the desired form has been provided. Further, this appreciable output signal may be of either polarity from a zero threshold and is substantially suitable for signal regeneration without special detecting, discriminating or synchronizing circuits regardless of the relative positions of the pulses which are applied to the circuit.

The novel features of this invention, as well as the invention itself, both as to its organization and method of operation, may best be understood and considered in the light of the following description taken in connection with the accompanying drawings, in which like reference numerals refer to like parts and in which.

Figure 1:
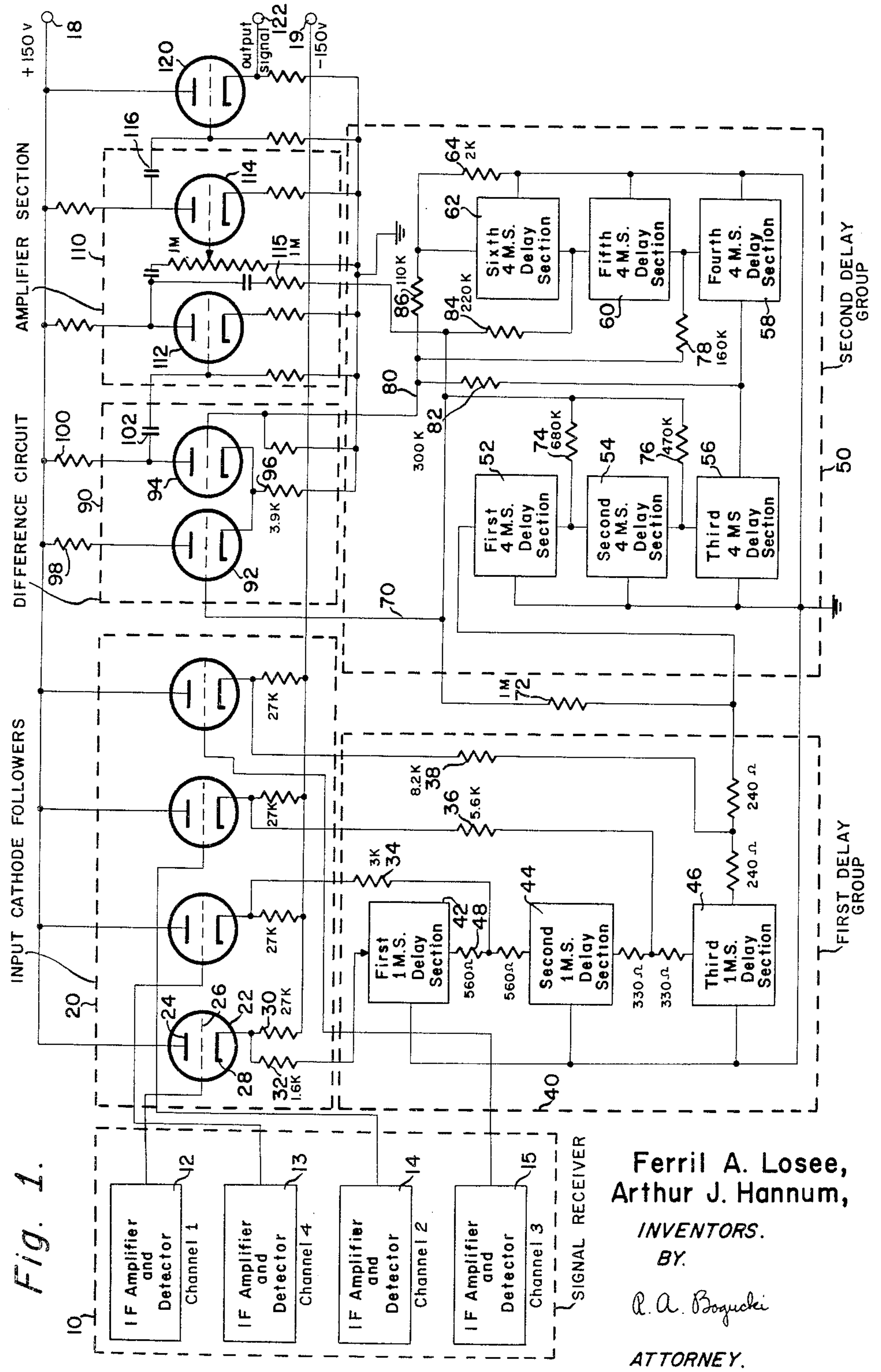
FIG. 1 is a circuit diagram of a decoding circuit in accordance with the invention.

A system with which the circuit of FIG. 1 may be employed is not described herein in detail. Various systems which employ quantized frequency modulation are known in the art and a number of expedients are available for providing the signal patterns which are employed with such modulation systems. The present invention will be described, however, in a particular environment. It will be understood that these examples are given only to illustrate the manner in which the invention may be put into practice and are not intended to confine the practice of the invention to the particular environment disclosed.

The circuit described herein is intended to operate with quantized pulses, each quantized pulse being expressed by an integral number of individual pulses. Each quantized pulse is here considered to represent a full symbol, and more specifically to denote a "mark" or "space" in the terminology conventionally employed in radio telegraphy. The integral number of individual pulses is further divided into frequency groups of pulses, each group consisting of a like number and sequence of time spaced individual pulses arranged in serial fashion. Each of these groups of pulses is time shifted an incremental amount with respect to the other pulses. The incremental time shifts between groups are in whole multiples of a basic amount. Thus, it may be seen by reference to FIG. 2 that there may be four groups of pulses, each of which consists of seven pulses equally spaced and of like polarity sequence. The pulses may be of either polarity, and thus may be regarded as "dual" symbols varying about a zero threshold. This use of dual symbol operation provides, as is evident from the description below, advantages in distinguishing input signals from noise. As is evident also from FIG. 2, the incremental time shift between groups of pulses is uniform between the respective groups. For purposes of describing the invention, a time spacing of four milliseconds between the serial pulses in each group and an incremental time shifting of one millisecond between like pulses of time-adjacent groups has been shown in FIG. 2. The shifting between the groups of pulses does not necessarily correspond to the number of the channels in which the signals occur, but appropriate recombination of these signals is made in the circuit shown in FIG. 1. It is understood that the idealized waveform of FIG. 2 may be subject to long term interference or relatively short term noise which causes random irregularities in the signal pattern.

From the signals thus provided as input, it is desired to provide, in this instance, a positive signal as a mark symbol output, a negative signal as a space symbol output, and as close to a zero threshold signal as is practical during interim periods in which only a portion of the serial signals may be present or during which long term interference may be affecting the transmission.

Figure 2:
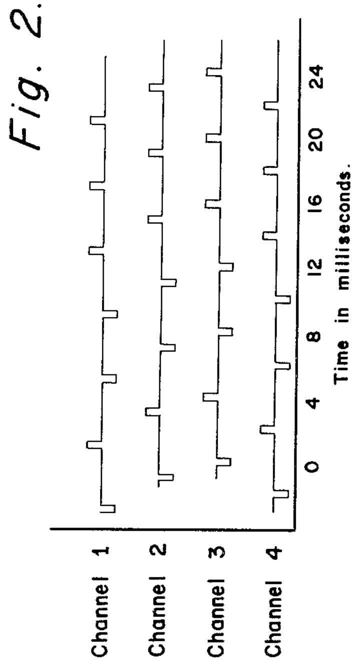
FIG. 2 is a waveform diagram of the time distribution of signals which may be provided as input to the circuit of FIG. 1.

The signal sequence shown in FIG. 2 is that for a mark symbol. It should be understood that the illustration which applies here assumes that a space symbol has a sequence which is the mirror image of the mark symbol sequence. It should also be understood that the various mark and space symbols may be transmitted in regular sequence, or in pulse position modulated sequence, or in a sequence in which only certain pulses have a different spacing than the remainder of the pulses. Specifically, it is assumed here that the first two symbols which make up a character have a time spacing between them which is greater than the remainder of the pulse spacings, in order to provide a synchronizing signal for the system in which they are employed. The signal decoding circuit of the present invention must, nevertheless, combine these signals into the desired symbol without use of external synchronization.

Referring now to FIG. 1, it may be seen that the circuit in accordance with the present invention derives signals from a receiver and detection system 10 operating as part of an over-all communication system (not shown). The receiver 10 includes, in this example, four I.F. amplifiers 12, 13, 14 and 15, each receiving and amplifying the signal in a different frequency channel. The remainder of the signal receiver 10 has been omitted for simplicity in describing the present invention. Signals received by the receiver 10 are, in accordance with well-known schemes, detected and ultimately applied to the decoding circuit of the present invention. By comparison of the time shifting pattern of the pulse groups shown in FIG. 2, it may now be seen that the signals provided from the I.F. amplifiers 12, 13, 14 and 15 of FIG. 1 vary by one millisecond each from channel 1 to channel 4 to channel 2 and then to channel 3. It will be understood by those skilled in the art that various schemes may be used in the receiver 10 for providing the envelopes of positive and negative pulses. Positive and negative detectors may be used, for example, in each channel, with the pulses therefrom being combined for application to the subsequent circuitry.

The signals in the four channels from the signal receiver 10 are each applied to a different cathode follower in a group of input cathode follower circuits 20. Inasmuch as each of the input cathode followers 20 is coupled in like fashion, only one of the cathode followers will be described in detail. A first cathode follower tube 22 has its anode 24 coupled to a source of positive potential, here designated as a +150 volt source 18. The electron grid 26 of the first cathode follower 22 is coupled to the output of the I.R. amplifier and detector 12 for the first channel in the signal receiver 10. The cathode 28 of the first cathode follower 22 is coupled to a source of negative potential, here designated as a −150 volt source 19, through a cathode load resistor 30. In accordance with conventional cathode follower action, when a positive signal is applied to the electron grid 26 of the first cathode follower 22, the cathode 28 goes more positive, thus "following" the potential of the electron grid 26. Consequently, a noninverted amplified pulse is provided from the cathode followers 20 in response to signals in the various channels from the signal receiver 10.

The input cathode followers 20 are coupled to a first delay group 40 by individual connections between the cathode of each one of the cathode followers and different points of the first delay group 40. Because each of the input cathode followers 20 is coupled to a different point of the first delay group 40, each signal is subject to a different amount of attenuation or insertion loss caused by the first delay group 40. In order to present each signal with the same amount of over-all attenuation, weighting resistors are provided. A first weighting resistor 32 couples the cathode 28 of the first cathode follower 22 to the input of the first delay group 40. Each of the other input cathode followers 20 is individually coupled through second, third and fourth weighting resistors 34, 36 and 38, respectively, to a different point along the first delay group 40. Each of the weighting resistors 32, 34, 36 and 38 is given a certain weighting value which, in conjunction with the values in the first delay group 40, establishes that equal signals derived from the input cathode followers 20 contribute equally to the output of the first delay group 40. Or, stated differently, each of the signals is subjected to the same amount of over-all attenuation.

The first delay group 40 includes first, second and third one millisecond delay sections 42, 44 and 46, respectively. The adjacent delay sections, such as the first and second delay sections 42 and 44, are coupled together by a centrally tapped resistive element 48. The centrally tapped resistive element 48 between these two delay sections 42 and 44 and the second weighting resistor 34 are together arranged to form a T-pad which gives a selected attenuation of the signal transmitted between the successive delay sections 42 and 44. The attenuation between the second and third one millisecond delay sections 44 and 46, and the attenuation between the third one millisecond delay section 46 and the output of the first delay group 40, is similarly arranged in conjunction with the associated third and fourth weighting resistors 36 and 38, respectively. Consequently, although equal signals are not provided from the input cathode followers 20 to the individual points along the first delay group 40, each of the signals contributes equally to the output ultimately derived from the first delay group 40. That is to say that although the signals are attenuated by different amounts before being applied to the individual points along the first delay group 40, the sum of the attenuation provided by the weighting resistors and the attenuation provided by the first delay group 40 is the same for each signal. Thus, the proportion of contribution of each signal to the output signal derived from the first delay group 40 is unchanged.

The output of the first delay group 40 is coupled to the input of a second delay group 50, consisting in this example of first through sixth four millisecond delay sections, 52 through 62 respectively. Inputs are provided to the first four millisecond delay section 52 and the energy delayed thereby is transferred serially through the intermediate delay sections 54, 56, 58 and 60 to the sixth fourmillisecond delay section 62, the output of which is coupled through a grounding resistor 64 to ground. Consequently, signals provided to the input of the second delay group 50 may be considered to be made available at the intermediate points along the various delay sections 52 through 62, as well as at the input and output of the second delay group 50.

Two separate groups of summation resistors are coupled in a predetermined fashion to the input, the output and the intermediate taps along the second delay group 50. What may be termed the first summation network comprises, in this example, individual resistors 72, 74, 76 and 84 having one terminal coupled to the points shown along the second delay group 50. The remaining terminals of the resistors of the first summation network resistors 72, 74, 76 and 84 are coupled to a first summation network lead 70. In like fashion, a second summation network lead 80 is coupled through individual resistors 82, 78 and 86 to other individual points along the second delay group 50. Note that, in accordance with the values given for the various resistors 72 through 78 and 82 through 86, there is a consistent pattern of attenuation along the successive delay sections 52 through 62 of the second delay group 50 which provide like contributions to the signals on the respective summation network leads 70 and 80. More precisely, the total attenuation is adjusted to be the same for each signal by the selection of appropriate values for the individual summation resistors 72 through 78 and 82 through 86. Thus, although each signal is taken from a different point along the successive delay sections 52 through 62 of the second delay group 50, and thus is subject to a different amount of attenuation thereby, this difference is compensated for by the difference in the values of the summation resistors 72 through 78 and 82 through 86. Accordingly, the proportion of contribution of each signal to the output signals derived from the second delay group 50 is unchanged.

A difference amplifier or difference circuit 90 is coupled to the summation network leads 70 and 80 provided from the second delay group 50. The difference circuit 90 includes what are here termed first and second difference tubes, 92 and 94 respectively. The cathodes of the first and second difference tubes 92 and 94 are coupled together and to ground through a common cathode resistor 96. The anode of the first difference tube 92 is coupled to the +150 volt source 18 through an anode load resistor 98, and the anode of the second difference tube 94 is likewise coupled to the +150 volt source 18 through an anode load resistor 100. The action of this difference circuit 90 will be described in greater detail in accordance with the operation of the circuit provided below. Note, however, that the coupling to the grid of the first difference tube 92 from the first summation network lead corresponds to the time distribution of the positive pulses shown as the input for a mark symbol in FIG. 2. It is necessary to remember in making this comparison that the last signal provided in a sequence in FIG. 2, when the time is equal to twenty-four milliseconds, is at the input of the second delay group 50 at this time. The last pulse is therefore applied through its summation resistor 72 to the grid of the first difference tube 92. The next-to-last pulse (second from the right in any of the pulse groups of FIG. 2) is at the input of the second 4 millisecond delay section 54 at this time and is applied to the first difference tube 92 through its summation resistor 74. Similarly, the third pulse from the right will be at the input to the third delay section 56, and the sixth pulse from the right will be at the input to the sixth delay section 62. Thus, all the positive pulses will be applied to the grid of the first difference tube 92 simultaneously. The inputs provided on the second summation network lead 80 therefore correspond to the pattern of the negative pulses in the mark symbol configuration shown in FIG. 2.

The output of the difference circuit 90 is provided through a coupling capacitor 102 to an amplifier section 110. The amplifier section 110 includes a pair of inverter amplifier triodes 112 and 114, respectively. Signals applied to the grid of the first inverter amplifier 112 are inverted at the anode thereof and applied to the grid of the second inverter amplifier 114. Signals are also applied from the anode of the first inverter amplifier 112 through a feedback resistor 115 to the grid of the first difference tube 92. This feedback loop serves to provide greater linearity and stability for the difference circuit 90. The again inverted output at the anode of the second inverter amplifier 114 is provided through a coupling capacitor 116 to an output cathode follower 120. Output signals are derived at an output terminal 122 coupled to the cathode of the output cathode follower 120. The couplings between the individual elements in the amplifier section 110 and of the output cathode follower have been provided in the drawing, but are not described in detail, inasmuch as these arrangements are well understood by those skilled in the art.

Figure 3:
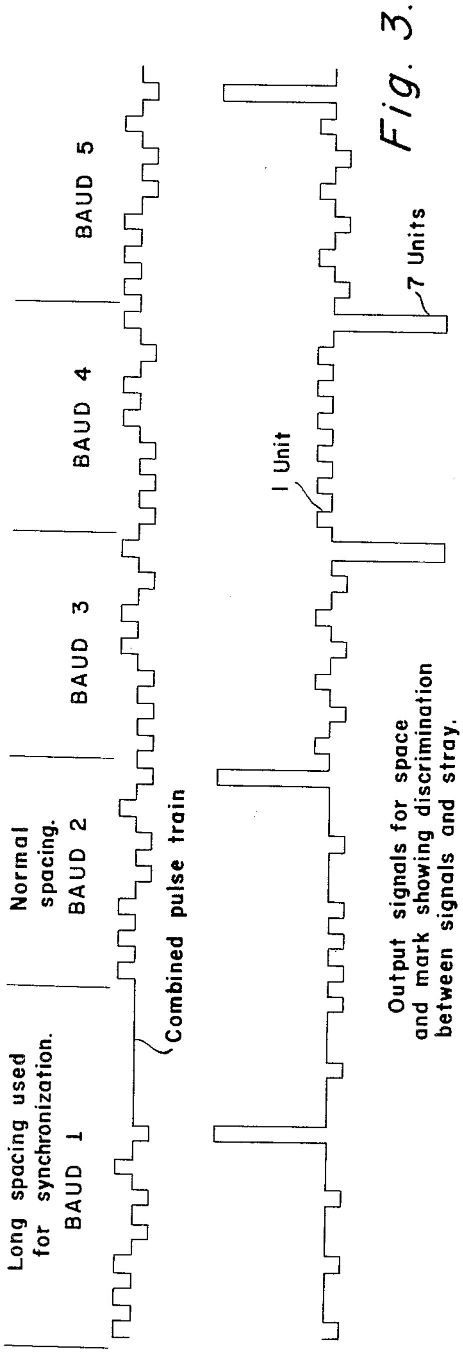
FIG. 3 is a waveform diagram of signals which may be provided as output from the circuit of FIG. 1.

In operation, referring now to FIGS. 1, 2 and 3, it is desired additively to combine the incrementally time shifted pulse sequences shown in FIG. 2 into successive symbols, of either polarity, as shown in FIG. 3. The signal sequences shown in FIG. 2 arrive in time-spaced relation at the signal receiver 10 of FIG. 1. Through the remainder of the circuit (not shown) in the signal receiver 10 the signals in the separate frequency channels are detected and ultimately applied as pulse sequences to the I.F. amplifiers 12, 13, 14 and 15 in the respective channels in which they occur. In accordance with this system, these pulses are of relatively equal amplitude, as shown in FIG. 2, and are equally spaced. For purposes of illustrating the operation of the system the incremental time shifting of the sequences of pulses is shown to vary in a nonprogressive seqence between the successive channels. Thus, as may be seen in FIG. 2, signals in channel 1 arrive one millisecond prior to the like signal in channel 4, which in turn arrives one millisecond prior to the like signal in channel 2 and wihch subsequently is followed at a further one millisecond interval by the signal in channel 3. It is to be noted that the probability of receiving a reliable signal through noise and fading effects is greatly enhanced by this arrangement. In the first place, the noise may be limited to the amplitude selected for the pulse information and will seldom be of a consistent nature for all pulses and frequencies. In the second place, the effects of fading are considerably diminished by the use of different frequencies, because fading occurring at one frequency will not occur equally at the others. There thus may be considered to be the preservation of an analog relationship which preserves the best characteristics of frequency and pulse modulation. All the elements of a quantized pulse are maintained in their original form following the detection, and when recombined in this decoding circuit contribute the full value of the intelligence in the transmitted signal.

Accordingly, the pulse sequences in each of the channels are applied from the signal receiver 10 to the input cathode followers 20. The signal in each channel, such as the signal from the I.F. amplifier 12 for frequency channel 1, is applied to a different cathode follower, such as the first cathode follower 22. Each of the input cathode followers 20 provides an output signal, of like polarity to the applied input pulse, to the associated weighting resistor 32, 34, 36 or 38 and the first delay group 40. The weighting resistors 32 through 38 are arranged with the associated resistive elements along the first delay group 50, such as the centrally tapped resistive element 48, to provide equal signal contributions from the individual input cathode followers 20 to the output signal from the first delay group 40. Consider, for example, the contribution of the signal from the first cathode follower 22 and the next subsequent cathode follower. By comparing the resistive values of the first weighting resistor 32 and the second weighting resistor 34 it may be seen that the input to the first delay group 40 is diminished more than the signal attenuated by the second weighting resistor 34. Further signal compensation is made by the centrally tapped resistive element 48 coupled between the output of the first one millisecond delay section 42 and the input of the second one millisecond delay section 44. Thus, with equal signals derived from the cathode followers 20, there is an equal contribution of energy to the output of the successive delay sections 42, 44 and 46 and the ultimate output of the first delay group 40 represents equally the contributions of each of the input cathode followers 20. The incrementally time shifted pulses received from the signal receiver 10 may be seen to be shifted into time coincidence by the delay sections 42, 44 and 46 in the first delay group 40. The signal from channel 1, which precedes that from channel 4 by one millisecond, is delayed in time so as to be in coincidence with the signal from channel 4, and this initially combined signal is in like fashion combined also with the signals from channels 2 and 3.

The output of the first delay group 40 is therefore a single sequence of pulses occurring at the time of the pulses from channel 3 and representing the additive combinations of the signals from all channels. The sequence is shown in the upper waveform of FIG. 3 which also illustrates the relative spacing which may occur between successive groups of pulses. These signals are applied in serial fashion to the input of the second delay group 50. The second delay group 50 effects a conversion from the serial time spaced form to a parallel relationship, although it is to be noted that the desired signal is to be provided only when a full symbol pulse sequence is made available at the second delay group 50. This result is achieved by the relationship of the code which is used and the corresponding combination of the two associated summation networks. By comparing the couplings of the summation networks to the various taps along the second delay group 50 it may be seen that only a small signal, if any, will be provided for any pulse sequence less than a full sequence. This relationship exists whether a mark symbol is provided, as in the pattern shown in FIG. 2, or whether the space symbol, which is the mirror image of the mark symbol, is provided. Consider, for example, the application of the first pulse, a negative pulse, for a mark symbol sequence. The first negative pulse will be attenuated through the first summation network resistor 72 to be applied to the first summation network lead 70. No signals will then be present on the remaining taps of the second delay group 50, assuming that this is the first signal of a message. When the first negative pulse of the mark symbol has been transmitted through the first four millisecond delay section 52, however, it is made available at the output of the first delay section 52 at the same time as the subsequent second pulse is applied to the input of the first delay section 52. The attentuation provided by the coupled first summation network resistor 72 and the adjacent first summation network resistor 74 insures that the contributions from the successive taps along the second delay group 50 to the first summation network lead 70 are equal. Illustrative values are given for the various summation network resistors 72 through 78 and 82 through 86 to show the manner in which equal signal contributions may be provided. It will therefore be understood that the first, negative, and second, positive, pulses are equal and cancel each other. The effective cancellation of all signals but the desired single output signal is achieved in similar fashion as subsequent pulses are transmitted along the second delay group 50. As may be seen in the lower waveform of FIG. 3, during the period of transmission of the series of pulses along the second delay group 50 there may be some small positive or negative pulses in addition to zero threshold signals, depending upon whether there is cancellation of all or of all but one of the pulses in each of the summation network groups. Nevertheless, the full output signal in this example may be considered to be seven times the unity output signal of either polarity derived during these interim conditions of operation.

Further pulse cancellation of all but the desired signal is achieved through combination of the parallel conversion (effected by the second delay group 50) with the difference signal summation provided by the difference circuit 90. The arrangement of the difference circuit 90 is such that like pulses applied on the two input leads 70 and 80 are used to cancel each other, whereas pulses of opposite polarity are additively combined into a single pulse of either polarity. This result is achieved by the operation of the second delay group 50 outputs with the difference circuit 90.

In the quiescent condition, with no signals applied, the output of the difference circuit 90 taken through the coupling capacitor 102 may be considered to be at a zero threshold. Both the first and second difference tubes 92 and 94, respectively, are conducting in this condition of operation. Positive signals of equal amplitude which are applied to the control grids of each of the difference tubes 92 and 94, respectively, cause the cathode of the first difference tube 92 to rise in potential correspondingly and tend to cause the anode of the second difference tube 94 to drop in potential correspondingly. Because the first and second difference tubes 92 and 94 are coupled with a common cathode resistor 96, however, the rise of the cathode of the first difference tube 92 causes a corresponding rise in the cathode of the second difference tube 94 and prevents the anode thereof from dropping in potential to decrease the output signal provided from the difference circuit 90. Similarly, negative pulses applied to both of the difference tubes 92 and 94, respectively, effect a combination of the cathode follower action of the first difference tube 92 with the coupled inverter amplifier action of the second difference tube 94 to cancel the tendency of the signal output from the difference circuit 90 to be changed. If signals of opposite polarity are derived from the summation network leads 70 and 80, however, the difference circuit 90 acts as a difference amplifier to provide a signal which additively combines the difference of the two applied inputs to provide a signal of representative polarity as well as amplitude. A positive signal on the first difference tube 92 input and a negative signal on the input of the second difference tube 94 results in a high amplitude output from the difference circuit 90. The positive signal on the first difference tube 92 tends to bring up the potential of the commonly connected cathodes of the two difference tubes 92 and 94. The negative signal on the input of the second difference tube 94 tends to increase the potential of the anode of that tube. Because the commonly coupled cathodes are also increased in potential, however, the anode of the second difference tube, which is the output of the difference circuit 90, has a further increase in potential representative of the total difference between the two pulses. Thus, for a positive signal on the first summation network lead 70 and a negative signal on the second summation lead 80, the difference circuit 90 provides a high amplitude positive pulse.

The example just given is seen to be the signal desired for a mark symbol. By comparison of the symbol pattern shown in FIG. 2 with the couplings of the two summation networks to the second delay group 50, it will be seen that full amplitude pulses are only provided at the one time when the full signal sequence has been delivered to the second delay group 50. Before such time and after such time there is effective signal cancellation of all but the unity level pulses. When the full pulse sequence is available in parallel fashion from the second delay group 50, however, negative pulses are provided to the second summation network lead 80 through each of the associated summation network resistors 82, 78 and 86. At the same time, positive signals are provided on the first summation network lead 70 through the first summation network resistors 72, 74, 76 and 84. Because of the additive combination, the signal on the second summation network lead 80 is a negative signal of three times unity amplitude, while the signal on the first summation network lead is a positive signal of four times unity amplitude. The output of the difference circuit 90 then corresponds, as may be seen in FIG. 3, to a positive signal, a mark symbol, of seven times unity amplitude.

With the space symbol, which is the mirror image in time pattern of the mark symbol, exactly the opposite signal pattern and additive combination is derived on the summation network leads 70 and 80. Therefore, a negative signal of four times unity amplitude is applied to the input of the first difference tube 92 and a positive signal of three times unity amplitude is applied to the input of the second difference tube 94. Because of the decrease in the potential of the common cathodes of the two tubes 92 and 94 and the decrease in the potential of the anode of the second difference tube 94, the output of the difference circuit 90 is a negative signal, a mark symbol, of seven times unity amplitude. As may be seen in the waveforms of FIG. 3, a train of pulses for each baud of a coded character is converted into a train having a single high amplitude pulse of either polarity to denote the symbol for the baud. The system is not dependent on gating or synchronization pulses or specific baud spacings as may be seen from the waveforms of FIG. 3.

Important advantages in discriminating the desired full amplitude signal from noise, fading and other effects will now be appreciated. Noise signals are effectively canceled against each other by being opposed to each other in the difference circuit 90. The fading effects which may cause one channel to diminish entirely during the transmission of a symbol pulse series does not alter the contribution of the remaining channels and an appreciable signal, easily distinguishable from disturbing influences, is therefore provided. The pulses which exist in the second delay group 50 prior to the establishment of a full parallel grouping of the pulses in a symbol never combine to more than a unity amplitude output from the difference circuit 90. Similarly, the stray pulses which exist subsequent to the derivation of the full pulse are likewise effectively canceled against each other.

The output of the difference circuit 90 is itself a useful signal without further regeneration. For practical purposes, however, it may be desired to apply these signals to an amplifier section 110 which includes a series pair of inverter amplifiers 112 and 114. The output of the amplifier section 110 applied through a coupling capacitor 116 to a cathode follower 120 results in a power signal of like polarity to that derived at the difference circuit 90 output at the output terminal 122 of the system.

Thus there has been provided an improved pulse decoding system for deriving signals of either polarity from like pulse sequences shifted incrementally in time. The circuit is highly reliable and especially effective in discriminating against adverse effects caused by noise and deterioration due to the propagation medium.

What is claimed is:

1. For a communication system using a number of groups of serially time spaced pulses, with the groups occurring at incrementally different times, a circuit for providing, from the groups of pulses, a summation pulse of either polarity suitable for signal regeneration comprising: a first plurality of serially coupled delayed line sections each responsive to a different group of signals and the previous delay section, the final delay line section of said first plurality providing a single combined group of serial pulses; a second plurality of serially connected delay sections having an input responsive to the single combined group of pulses from said first plurality of delay line sections; a pair of resistive summation networks, each coupled to a different plurality of selected points in said second plurality of delay line sections and being arranged to provide combined signals deriving equal contributions from the energy provided from the coupled delay line section; and means including a difference amplifier consisting of a pair of cathode coupled electron discharge devices, each responsive to the signals provided from a different one of said resistive summation networks for providing summation pulses of either polarity representative of the signal pattern derived by said pair of summation networks.

2. For a communication system using a predetermined number of groups of time spaced pulses occurring at incrementally different times, a circuit for providing, from the groups of pulses, a single summation pulse of either polarity suitable for signal regeneration comprising signal adding means including delay line means for providing a single combined group of pulses from said number of groups of pulses; means, including a plurality of serially connected delay sections individually tapped to provide an energy distribution from pulses transmitted along said delay sections, for providing two individual signals from the energy provided thereto; and means including a cathode coupled differential amplifier having at least two control element inputs, said control element inputs each being responsive to a different one of the outputs of said means for providing a pair of signals, said means providing at the output of said differential amplifier a single summation pulse of either polarity for each predetermined number of pulse groupings.

3. A system for recombining a quantized pulse arranged in time varying like signal groups comprising: means for additively combining the signal groups into a single signal group; means responsive to said single signal group for providing a coincident group of pulses of equal amplitude and corresponding polarity therefrom; polarity grouping means coupled to said converting means for additively providing a polarity pulse representative of the coincident signal available thereto at any particular time; and means responsive to the two polarity pulses for additively combining said pulses into a quantized pulse of either polarity.

4. In a communications system employing a code in which each symbol is represented by a plurality of serial pulses of a fixed number but varying in time position and in frequency in a predetermined pattern, a circuit for providing summation symbol pulses comprising: means including a first plurality of serially connected delay lines; means for providing inputs from signals of different frequencies to different ones of said serially connected delay lines such that each signal contributes a proportional amplitude to the output resulting from the last of the delay lines; a second pluraltiy of individual delay line sections connected serially and responsive to the output from said first plurality of delay lines; a signal difference circuit having a pair of inputs and a pair of summation networks each including a plurality of resistors, each of said resistors being coupled at one terminal to a different point in the second plurality of delay lines, the remaining terminals of said resistors being coupled to the others of the same network, the values of said resistors being selected so that energy from each point on said second plurality of delay lines contributes an equal amount of signal, each of said networks being coupled to a different one of the inputs of said difference amplifier.

5. A circuit for adding the pulse amplitudes of a plurality of individual pulses arranged in time sequence and representing a symbol, said circuit comprising: means responsive to individual signal trains for providing a single time spaced sequence of individual pulses of either polarity from a zero threshold; a plurality of serially-connected delay line sections responsive at an input to said single train of pulses and having a total delay sufficient to make concurrently available in parallel fashion the energy from all of the pulses of a symbol; a plurality of resistive elements, each coupled to an individual and different point on said delay line sections, the values of said resistive elements decreasing successively from the input of said delay line sections; a first coupling coupled to a first plurality of said resistive elements, the elements of said first plurality being selected to correspond to like pulses of one polarity for the symbols represented by said pulse train; a second coupling connected to the remaining resistive elements of said plurality and grouping together the like pulses of the other polarity; a cathode coupled difference amplifier including a pair of electron discharge devices, said electron discharge devices being coupled together such that an output signal is provided at the anode of one which is representative of the difference in the signals applied to the grids of each of the tubes, each of the control elements of said electron discharge devices being coupled to a different one of said groups of resistive elements through the associated coupling, such that when all of a pulse train is available in said delay line sections signals are provided from the successive points on said sections through said resistive elements to said cathode coupled difference amplifier and only one output signal is produced representative of the symbol represented by the applied pulse sequence.

6. A system for providing mark and space symbols of opposite polarity from a plurality of pulse sequences, each of said pulse sequences consisting of a fixed number of individual pulses of a selected polarity pattern, said pulse sequences being incrementally time-shifted with respect to each other, said number being an odd number and the polarity pattern for a mark symbol being the mirror image of the space symbol, said system comprising: means including a first plurality of serially-connected delay sections responsive at different points therealong to the different time-shifted groups of pulses for additively combining said pulses into a single group of pulses; means including a second plurality of delay sections responsive to said means for additively combining for delaying the single group of pulses, the time delay provided by said second plurality of delay sections being selected such that the energy passing through said sections is made available at taps therealong at times corresponding to the pulse spacing of the individual pulses of said group; a plurality of resistors coupled to the successive taps along said second plurality of delay line sections, the attenuation value of each of said resistors varying inversely with the distribution of said resistor along the delay line from the input to said plurality of sections; said plurality of resistors being coupled at their opposite terminals into two separate groups corresponding to the polarity pattern of the pulses in an individual symbol group; and difference amplifier means having a pair of inputs each coupled to a different one of said groups of resistors for providing a signal representative of the number of signals of opposite polarity which are present in the respective groups and which are not canceled by opposing signals in the same group.

7. A system for providing mark and space symbols of opposite polarity from a plurality of detected pulse sequences, each of said pulse sequences consisting of a fixed number of individual pulses of a selected polarity pattern, said pulse sequences being incrementally time-shifted with respect to each other, said number being an odd number and the polarity pattern for a mark symbol being the mirror image of that for a space symbol, said system comprising: a plurality of cathode follower circuits, each responsive to a different pulse sequence; a first plurality of delay sections for time-shifting said sequences into coincidence; means including a plurality of resistive T pad circuits connecting the cathodes of the individual cathode followers to the successive ones of said first plurality of delay sections, and serially connecting said delay sections, the values of the resistive circuits being related such that a single combined pulse sequence is provided from said first plurality of delay sections with equal contributions being derived from said pulse sequences; a second serially-connected plurality of delay sections responsive at a first section to the combined pulse sequence, the time delay provided by said second plurality of delay sections being selected such that the energy passing through said sections is made available at taps therealong at times corresponding to the pulse spacing of the individual pulses of said group; a plurality of resistors coupled to the successive taps along said second plurality of delay line sections, the attenuation value of each of said resistors varying inversely with the distribution of said resistor along the delay line from the input to said plurality of sections; said plurality of resistors being coupled at their opposite terminals into two separate groups corresponding to the polarity pattern of the pulses in an individual symbol group; difference amplifier means having a pair of inputs each coupled to a different one of said resistors for providing a signal representative of the signals of opposite polarity which are present in the respective groups and which are not canceled by opposing signals in the same group; second amplifier means coupled to said difference amplifier means; and a resistive feedback circuit coupling said second amplifier means to one of said groups of resistors.

8. For a communication system using a number of groups of serially time spaced pulses, with the groups occurring at incrementally different times, a circuit for providing, from the groups of pulses, a summation pulse of either polarity suitable for signal regeneration comprising: a first plurality of serially coupled delay line sections each responsive to a different group of pulses and to delayed pulses from the previous delay line section, the final delay line section of said first plurality of delay line sections providing a single combined group of serial pulses; a second plurality of serially connected delay line sections having an input terminal coupled to said first plurality of delay line sections and responsive to the single combined group of pulses from said first plurality of delay line sections; a pair of resistive summation networks, each coupled to a different plurality of selected points along said second plurality of delay line sections for providing sum signals combined from a plurality of delayed pulses each having traversed a different number of said delay line sections, the resistance values of said summation networks being selected to provide equal overall attenuation for each of said delayed pulses; and means including a difference amplifier consisting of a pair of cathode coupled electron discharge devices, each coupled to a different one of said summation networks and responsive to said sum signals for providing summation pulses of either polarity representative of a signal pattern present in said groups of serially time spaced pulses.

9. For a communication system using a predetermined number of groups of time spaced pulses occurring at incrementally different times, a circuit for providing, from the groups of pulses, a single summation pulse of either polarity suitable for signal regeneration comprising signal adding means including delay line means for providing a single combined group of pulses from said number of groups of pulses; means, including a plurality of serially connected delay sections individually tapped to provide different time delays to each pulse of said combined group of pulses, coupled to said signal adding means for summing the pulses of said combined group of pulses into two individual signals; and means including a cathode coupled differential amplifier having at least two control element inputs, said control element inputs each being coupled to said aforesaid means and responsive to a different one of said individual signals, said last-named means providing at the output of said differential amplifier a single summation pulse of either polarity.

10. A circuit for adding the pulse amplitudes of a plurality of individual pulses arranged in time sequence and representing a symbol, said circuit comprising: means responsive to individual signal trains for providing a single time spaced sequence of individual pulses of either polarity from a zero threshold; a plurality of serially-connected delay line sections having an input terminal coupled to said means and being responsive to said single train of pulses and having a total delay sufficient to make concurrently available in parallel fashion the energy from all of the pulses of a symbol; a plurality of resistive elements, each coupled to an individual and different point on said delay line sections, the values of said resistive elements decreasing successively from the input terminal of said delay line sections; a first interconnection element coupled to a first plurality of said resistive elements, said first plurality of resistive elements being connected to predetermined points of said delay line sections corresponding to differences in time of occurrence of pulses of one polarity for the symbols represented by said pulse train; a second interconnection element connected to the remaining resistive elements of said plurality of resistive elements connected to predetermined points of said delay line sections corresponding to differences in time of occurrence of pulses of the other polarity; a cathode coupled difference amplifier including a pair of electron discharge devices, each having an anode, a cathode, and a grid, said electron discharge devices being coupled together such that an ouput signal is provided at the anode of one of said devices which is representative of the difference in amplitude of signals applied to the grids of said devices, each of the grids of said electron discharge devices being coupled to a different one of said groups of resistive elements through the associated interconnection element, such that when each pulse of a pulse train is available in said delay line sections, signals are provided from the successive points on said sections through said resistive elements to said cathode coupled difference amplifier and only one output signal is produced representative of the symbol represented by the applied pulse sequence.

References Cited in the file of this patent

UNITED STATES PATENTS

| | | |
|---|---|---|
| 2,706,810 | Jacobsen | Apr. 19, 1955 |
| 2,721,318 | Barker | Oct. 18, 1955 |
| 2,835,805 | Posthumus | May 20, 1958 |